(12) United States Patent
Grethel et al.

(10) Patent No.: US 11,378,139 B2
(45) Date of Patent: Jul. 5, 2022

(54) CLUTCH UNIT WITH TORSIONAL VIBRATION DAMPER AS CLUTCH SUPPORT, AND HYBRID MODULE COMPRISING CLUTCH UNIT

(71) Applicant: Schaeffler Technologies AG & Co. KG, Herzogenaurach (DE)

(72) Inventors: Marco Grethel, Bühlertal (DE); Loyal George MacMillian, Karlsruhe (DE); Markus Baehr, Bühl (DE); Carsten Mayer, Lohr a. Main (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/967,895

(22) PCT Filed: Jan. 15, 2019

(86) PCT No.: PCT/DE2019/100029
§ 371 (c)(1),
(2) Date: Aug. 6, 2020

(87) PCT Pub. No.: WO2019/154456
PCT Pub. Date: Aug. 15, 2019

(65) Prior Publication Data
US 2021/0054883 A1  Feb. 25, 2021

(30) Foreign Application Priority Data

Feb. 12, 2018  (DE) .......................... 102018103064.9

(51) Int. Cl.
*F16D 21/00* (2006.01)
*F16D 3/12* (2006.01)
(Continued)

(52) U.S. Cl.
CPC ............... *F16D 21/00* (2013.01); *F16D 3/12* (2013.01); *F16D 11/14* (2013.01); *F16D 13/52* (2013.01);
(Continued)

(58) Field of Classification Search
CPC ...... F16D 13/3683; F16D 13/52; F16D 11/14; F16D 3/12; F16F 15/13121
See application file for complete search history.

(56) References Cited

U.S. PATENT DOCUMENTS

2014/0235360 A1* 8/2014 Fender-Oberle .... F16F 15/1395
464/66.1
2016/0333943 A1* 11/2016 Chiba ..................... F16H 3/091
(Continued)

FOREIGN PATENT DOCUMENTS

CN       1991208 A    7/2007
CN     102422054 A    4/2012
(Continued)

*Primary Examiner* — Stacey A Fluhart
(74) *Attorney, Agent, or Firm* — Lekeisha Suggs

(57) ABSTRACT

A clutch unit for a powertrain of a motor vehicle is disclosed, comprising a torque input component acting as a drive element, a torque output component acting as an output element, being connectable so as to transmit a torque to the torque input component via a clutch that can be shifted using friction elements, and with a torsional vibration damper having two masses damped relative to one another to reduce rotational irregularities, which is arranged between the torque input component and the torque output component, at least one of the two masses of the torsional vibration damper being simultaneously designed as a support for a friction partner. The disclosure further relates to a hybrid module comprising a first drive machine, the output shaft of which can be connected to an output shaft of a second drive machine or a transmission input shaft via such a clutch unit.

8 Claims, 3 Drawing Sheets

(51) Int. Cl.
    *F16D 11/14*      (2006.01)
    *F16D 13/52*      (2006.01)
    *F16D 13/68*      (2006.01)
    *F16F 15/131*     (2006.01)
    *F16D 13/32*      (2006.01)

(52) U.S. Cl.
    CPC ...... *F16D 13/683* (2013.01); *F16F 15/13121* (2013.01); *F16D 13/32* (2013.01); *F16D 2300/22* (2013.01); *F16F 2222/08* (2013.01); *F16F 2232/02* (2013.01)

(56) References Cited

U.S. PATENT DOCUMENTS

| | | | |
|---|---|---|---|
| 2017/0326962 A1* | 11/2017 | Aringsmann | F16D 13/24 |
| 2018/0031052 A1 | 2/2018 | Diemer | |
| 2018/0244145 A1* | 8/2018 | Ohnemus | F16D 13/52 |
| 2020/0023725 A1* | 1/2020 | Hoess | B60W 10/06 |
| 2020/0232519 A1* | 7/2020 | Robner | F16D 25/061 |

FOREIGN PATENT DOCUMENTS

| | | |
|---|---|---|
| CN | 105387097 A | 3/2016 |
| CN | 105531515 A | 4/2016 |
| CN | 107110235 A | 8/2017 |
| CN | 107202147 A | 9/2017 |
| CN | 107532678 A | 1/2018 |
| CN | 206943255 A | 1/2018 |
| CN | 206943255 U | 1/2018 |
| DE | 3941251 A1 | 6/1990 |
| DE | 102009032336 A1 | 2/2010 |
| DE | 102009003108 A1 | 11/2010 |
| DE | 102010054545 A1 | 8/2011 |
| DE | 102011084641 A1 | 4/2012 |
| DE | 102011017660 A1 | 10/2012 |
| DE | 102015211436 A1 | 1/2016 |
| DE | 102015209898 A1 | 12/2016 |
| DE | 102016220576 A1 | 4/2017 |
| DE | 102015221368 A1 | 5/2017 |
| WO | 2014058239 A1 | 4/2014 |

* cited by examiner

CLUTCH UNIT WITH TORSIONAL VIBRATION DAMPER AS CLUTCH SUPPORT, AND HYBRID MODULE COMPRISING CLUTCH UNIT

CROSS-REFERENCE TO RELATED APPLICATIONS

This application is the U.S. National Phase of PCT Appln. No. PCT/DE2019/100029 filed Jan. 15, 2019, which claims priority to DE 10 2018 103 064.9 filed Feb. 12, 2018, the entire disclosures of which are incorporated by reference herein.

TECHNICAL FIELD

The disclosure relates to a clutch unit for a powertrain of a motor vehicle, with a torque input component acting as a drive element, for example a crankshaft or a crankshaft-fixed part for introducing torque of a first drive machine, such as, in particular, an internal combustion engine, a torque output component acting as an output element, for example, such as a transmission input shaft or an output shaft of a second drive machine, in particular an electrical machine, the torque output component being connectable to the torque input component so as to transmit a torque via a clutch that can be shifted using friction elements, such as friction linings and/or plates, in particular via a separating clutch, and with a torsional vibration damper having two masses damped relative to each other to reduce rotational irregularities, in particular of the internal combustion engine, which is arranged between the torque input component and the torque output component. Furthermore, the disclosure relates to a hybrid module comprising a first drive machine, the output shaft of which can be connected to an output shaft of a second drive machine or a transmission input shaft via such a clutch unit.

BACKGROUND

Such clutch units are already known from the prior art. For example, DE 10 2009 032 336 A1 obviously discloses a torque transmission device for the powertrain of a vehicle between a crankshaft of an internal combustion engine and a transmission input shaft, a transmission, comprising a separating clutch and a dual-mass flywheel, the dual-mass flywheel and the separating clutch being arranged in series between the crankshaft and the transmission input shaft, the dual-mass flywheel being arranged on the crankshaft side and the separating clutch being arranged on the transmission input shaft side.

DE 10 2010 054 545 A1 also discloses a torque transmission device for the vehicle powertrain between a crankshaft of an internal combustion engine and a transmission input shaft of a transmission, comprising a separating clutch and a dual-mass flywheel, the dual-mass flywheel and the separating clutch being arranged in series between the crankshaft and the transmission input shaft, the dual-mass flywheel being arranged on the crankshaft side and the separating clutch being arranged on the transmission input shaft side, wherein a rotor of the electric drive radially surrounds parts of the separating clutch, the separating clutch being a multi-plate clutch.

However, the prior art always has the disadvantage that such a clutch unit with an upstream torsional vibration damper requires a large installation space and the cost of reducing the rotational irregularities is very large. With wet-running, friction-based separating clutches, there are also high losses due to drag torque, while with dry-running, friction-based separating clutches, the space requirement is also high and it is also difficult to control with positive-fit-based separating clutches.

SUMMARY

It is therefore the object of the disclosure to avoid or at least to reduce the disadvantages of the prior art. In particular, a clutch unit is to be developed which, on the one hand, fulfills the function of a separating clutch and, on the other hand, the function of reducing rotational irregularities, and at the same time has a reduced installation space requirement and lower costs. In particular, a separating clutch is to be provided, in which there are low losses, which requires only a small installation space, which has good controllability and which can be produced cost-effectively.

The object of the disclosure is achieved according to the disclosure with a generic device in that at least one of the two masses of the torsional vibration damper is configured simultaneously as a support for a friction element.

This has the advantage of integrating the function for reducing rotational irregularities in the assembly, which fulfills the functions of the separating clutch (K0). In this way, axial installation space can advantageously be saved and the costs for reducing the rotational irregularities can be kept low.

Advantageous embodiments are claimed in the claims, and are explained below.

In addition, it is useful if at least one mass carrying/receiving the friction element is designed as a plate support.

Furthermore, it is advantageous if the clutch and the torsional vibration damper are arranged at least partially, preferably completely, in the same area in the axial direction. This means that the clutch and the torsional vibration damper are arranged at the same axial height. The total axial length can be reduced by the axial length for the function of reducing rotational irregularities.

It is advantageous if the clutch and the torsional vibration damper are arranged to be radially nested, i.e., one behind the other/one above the other in the radial direction. This radial nesting saves a considerable amount of axial installation space, namely the axial installation space otherwise required for the torsional vibration damper.

It is also useful if the torsional vibration damper is arranged in the radial direction outside the clutch. It is advantageous if the torsional vibration damper is arranged such that it radially surrounds the clutch. In this way, the moment of inertia can advantageously be increased.

In an alternative embodiment, it is also possible to arrange the torsional vibration damper in the radial direction within the clutch, so that the clutch radially surrounds the torsional vibration damper.

In addition, a favorable exemplary embodiment is characterized in that the clutch has two partial clutches by means of which the torque input component and the torque output component can be connected so as to transmit a torque. As a result, it is advantageously possible to design the two partial clutches differently, so that functions of the separating clutch can be split between the partial clutches.

In a preferred embodiment, one of the two partial clutches is designed as a positive-fit clutch and the other of the two partial clutches is designed as a friction/non-positive-fit clutch. For example, a friction clutch can be used for one function of the separating clutch and a positive-fit clutch for another function of the separating clutch to combine the advantages of both types of clutch. For example, a positive-fit clutch can be used for one function of the separating clutch, in particular starting of the first drive machine, and for another function of the separating clutch, in particular the coupling of the first drive machine, to be able to combine the advantages of both clutch types. The object of the disclosure is therefore achieved by a specific assignment of the functions to the two separating clutches, so that the friction clutch achieves high controllability for starting the engine with lower torque requirements and higher torques can be transmitted by the positive-fit clutch. This results in a reduction of the clutch losses and the required installation space as well as in an improvement in the controllability of the clutch and an optimal cost.

It is advantageous if the positive-fit clutch is designed as a shift dog device/dog clutch. In particular, it is advantageous if the positive-fit clutch is arranged and designed such that it is used to couple the internal combustion engine to the powertrain, i.e., when the transmission input shaft of the motor vehicle is driven by the internal combustion engine. It is thereby advantageously achieved that the output shaft of the internal combustion engine is coupled to the transmission input shaft without slippage and with very low losses.

It is also advantageous if the friction clutch is designed as a single-disc/multi-disc/multi-plate clutch. This ensures that the torque is not suddenly transmitted when the friction clutch is closed.

It is also advantageous if the friction clutch and the positive-fit clutch have independent or separate clutch stops to limit clutch travel.

It is advantageous if the friction clutch is arranged and designed such that it starts the internal combustion engine via the second drive machine/electrical machine. To start the internal combustion engine, an output shaft of the electrical machine is coupled to the internal combustion engine via the friction clutch, so that the torque applied by the electrical machine can be used to start, i.e., to tow-start, the internal combustion engine.

In a preferred embodiment, the friction surfaces of the friction clutch are flat or conical/tapered.

Furthermore, it is useful if an actuation direction of the one partial clutch is opposite to an actuation direction of the other partial clutch. As a result, actuation surfaces of different sizes can be used for the two partial clutches. In addition, this enables simple engagement and release when connecting via the positive-fit clutch and bridging/uncoupling of the torsional vibration damper when connecting via the friction clutch.

In addition, it is advantageous if the actuating surfaces of the friction partial clutch are different in size from the actuating surfaces of the positive-fit partial clutch. This has the advantage that it is not necessary to make a compromise between the necessary driving force for the friction clutch and the necessary actuation speed for the positive-fit clutch.

Furthermore, it is advantageous if the torsional vibration damper is arranged in such a way that it is decoupled from the powertrain when the positive-fit partial clutch is not actuated. This means that the torsional vibration damper is bypassed when the friction partial clutch is closed and the positive-fit partial clutch is open. That means that the torsional vibration damper is part of the powertrain only when the positive-fit partial clutch is closed. As a result, the torsional vibration damper advantageously does not have to be carried along when the internal combustion engine is being tow-started, but is in the powertrain only when a reduction in rotational irregularities is also necessary.

It is also possible that an actuation direction in which the partial clutches are set so as to be actuated is identical to an actuation direction of the other separating clutch. This means that the two partial clutches are actuated in the same actuation direction. In particular, an actuation system for actuating the two partial clutches is arranged and designed in such a way that the friction partial clutch is actuated before the positive-fit partial clutch is actuated. It is thus achieved in a simple manner that the internal combustion engine is first tow-started via the actuation of the friction partial clutch before it is coupled to the transmission input shaft via the actuation of the positive-fit partial clutch for driving the motor vehicle.

It is also advantageous if the two partial clutches are designed so that they are actuated via a rotary joint. As a result, both a necessary contact pressure for the friction clutch and the necessary speed for the positive-fit clutch can be achieved.

It is particularly advantageous if the rotary joint is made with small friction diameters. A loss torque is thus kept low.

In addition, it is useful if the two partial clutches are arranged in such a way that they are actuated via a common actuation system. This eliminates the need for additional elements for actuation.

In addition, it is advantageous if the clutch unit according to the disclosure is used in a wet-running system, since actuation via rotary joints can then be easily integrated.

It is advantageous if the torsional vibration damper is designed as a dual-mass flywheel that has a primary flywheel that is arranged on the engine side/on a primary side, i.e., on the side of the internal combustion engine, and has a secondary flywheel that is arranged on the transmission side/on a secondary side.

In a preferred embodiment, the friction partial clutch and the positive-fit partial clutch are connected to a secondary side/to a secondary mass of the dual-mass flywheel, that is to say on a transmission side of the dual-mass flywheel.

It is advantageous if the friction partial clutch is arranged in the direction of the engine/internal combustion engine or if the positive-fit partial clutch is arranged in the direction of the engine. In addition, it is preferred if the friction partial clutch is designed as a cone clutch with conically arranged friction elements.

In a further preferred embodiment, the friction partial clutch is connected to a primary side/primary mass of the dual-mass flywheel and the positive-fit partial clutch is connected to a secondary side/secondary mass of the dual-mass flywheel.

It is advantageous if the two partial clutches are arranged to be axially nested or if the two partial clutches are arranged to be radially nested. As a result, the installation space required can be kept very small.

In an additional advantageous embodiment, detents are provided on the clutch, which when the positive-fit partial clutch is actuated, move into an end position in which a claw of the dog clutch is engaged, that is to say the positive-fit partial clutch is closed, and is released in a central position in which both partial couplings are not activated. This improves the controllability of the positive-fit partial clutch and a "normally-stay" behavior.

The object of the disclosure is also achieved by a hybrid module, for example for a P2 hybrid application, with a first drive machine, in particular an internal combustion engine, the output shaft of which is connectable via a clutch unit according to the disclosure with an output shaft of a second drive machine, in particular an electrical machine, or a transmission input shaft.

It is advantageous if the output shaft of the first drive machine serves as a torque input component and/or the output shaft of the second drive machine or the transmission input shaft serves as a torque output component. It is also useful if a friction partial clutch of the clutch for starting the first drive machine via the output shaft of the second drive machine and/or a positive-fit partial clutch of the clutch for slip-free coupling of the first drive machine to the output shaft of the second drive machine or to the transmission input shaft is/are used.

In other words, the disclosure relates to an assembly in which the function of the separating clutch and the function for reducing rotational irregularities of an internal combustion engine are combined. These two functions are essentially arranged to be radially nested so as to be as axially short as possible. The function for reducing rotational irregularities lies radially on the outside and the function of the separating clutch is seen radially on the inside. For example, a dual-mass flywheel or a centrifugal pendulum can be used to reduce rotational irregularities.

In addition, the functions of the separating clutch are divided into a function to couple the internal combustion engine to the transmission and a function to start the internal combustion engine. A positive-fit element (a shift dog device) is used for coupling to the internal combustion engine and a modulatable friction element is used for tow-starting. The friction element can be single- or multi-surface as well as flat or conical.

The directions of movement for the two functions can be identical or in opposite directions. When the functions are implemented in one direction of movement, the "friction function" is first carried out before the slip-free "clutch function" when the internal combustion starts. Regardless of the actuation in the same or in the opposite direction, the realization of the "clutch" function is characterized by the fact that after the execution of the movement to activate the function, there is no or only very little loss. The execution of the functions in opposite directions is advantageous, since on the one hand a simple active engagement and release for the clutch function and on the other hand for "tow-starting" the function for reducing rotational irregularities during the starting process can be bridged, which can significantly reduce the mechanical load thereof. In addition, actuation surfaces of different sizes can thereby be used, so that no compromise need be made between the necessary contact pressure of the friction element and the necessary actuation speed for the claw device. In wet-running systems, both functions can advantageously be operated via the shafts and rotary joints on small friction diameters.

BRIEF DESCRIPTION OF THE DRAWINGS

The disclosure is explained below with the aid of drawings. Herein.

The figures are only schematic in nature and serve only for understanding the disclosure. The same elements are provided with the same reference symbols. Different features of the exemplary embodiments can be interchanged.

DETAILED DESCRIPTION

Figure 1:
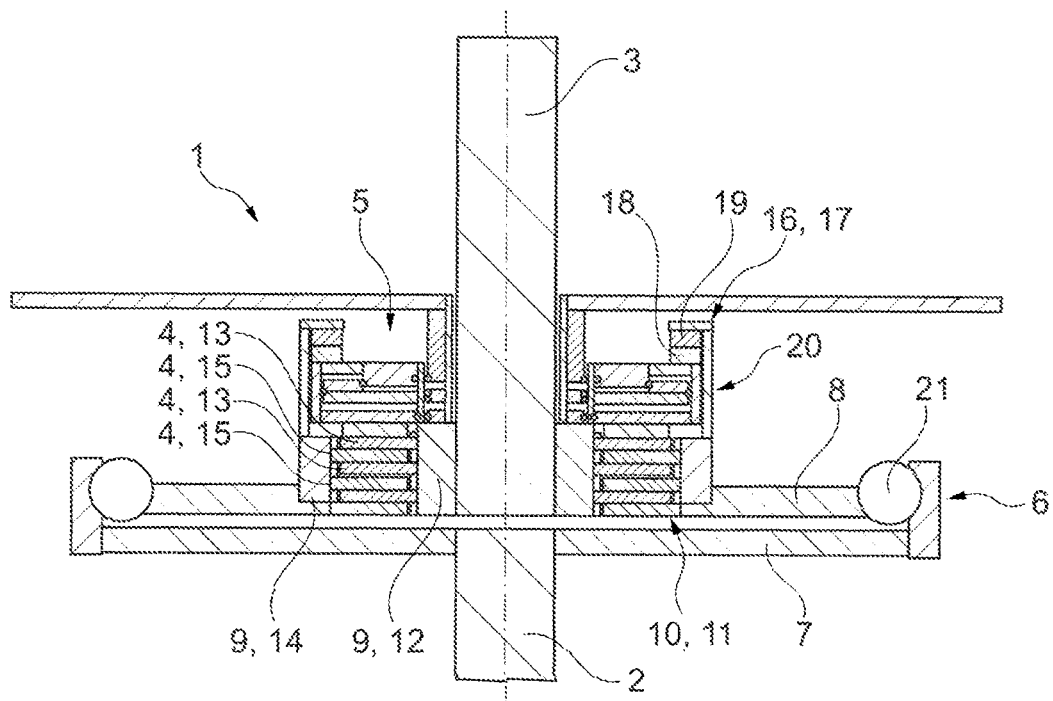
FIG. 1 shows a longitudinal sectional view of a clutch unit according to the disclosure in a first exemplary embodiment with a friction partial clutch and a positive-fit partial clutch of a separating clutch, which are connected to a secondary mass of a torsional vibration damper, the friction partial clutch being arranged in the direction of a first drive machine.

FIG. 1 shows a clutch unit 1 for a powertrain of a motor vehicle. The clutch unit 1 has a torque input component 2 acting as a drive element (or as an output element) and a torque output component 3 acting as an output element (or as a drive element). The torque output component 3 can be connected to the torque input component 2 so as to transmit a torque via a clutch/separating clutch 5 that can be shifted using friction elements 4. For reducing rotational irregularities, the clutch unit 1 also has a torsional vibration damper 6 which is designed as a dual mass flywheel. The torsional vibration damper 6 has a primary mass 7 which is connected to the torque input component 2, and a secondary mass 8 which is connected to the torque output component 3 via the clutch 5. The primary mass 7 is damped relative to the secondary mass 8. The primary mass 7 or the secondary mass 8 simultaneously serves as a support 9 for a friction element 4 of the clutch 5 or is formed integrally with the support 9.

The clutch 5 has a friction partial clutch 10, which is designed as a multi-plate clutch 11. When the friction partial clutch 10 is closed, the torque input component 2 and the torque output component 3 can be connected so as to transmit a torque. The multi-plate clutch 11 has an inner plate support 12, which receives inner plates 13 in a rotationally fixed but axially displaceable manner, and an outer disc support 14, which receives outer plates 15 in a rotationally fixed but axially displaceable manner. The inner plates 13 and the outer plates 15 serve as the friction elements 4. The outer plate support 14 is formed integrally with the primary mass 7 or the secondary mass 8. In a first exemplary embodiment, which is shown in FIG. 1, the outer plate support 14 is formed integrally with the secondary mass 8.

The torsional vibration damper 6 is arranged at the same axial height as the clutch 5, so that the torsional vibration damper 6 and the clutch 5 are arranged to be radially nested. The torsional vibration damper 6 is arranged to be radially outside the clutch 5 so that it radially surrounds same.

The clutch 5 has a positive-fit partial clutch 16 which is designed as a dog clutch/dog switching device 17. When the positive-fit partial clutch 16 is closed, the torque input component 2 and the torque output component 3 can be connected so as to transmit a torque. The dog clutch 17 has a claw 18 on the torque output component side and a claw 19 on the torque input component side.

The positive-fit partial clutch 16 and the friction partial clutch 10 are actuated by a rotary joint 20. In this case, an actuation direction of the positive-fit partial clutch 16 is opposite to an actuation direction of the friction partial clutch 10. The actuation directions can also be identical, even if this is not shown in the drawings.

In all embodiments, the friction partial clutch 10 and the positive-fit partial clutch 16 have stops which are independent or separate from one another, as a result of which the clutch unit 1 differs from a classic transmission synchro unit.

In the first exemplary embodiment, which is shown in FIG. 1, the outer plate support 14 for the friction partial clutch 10 and the torque input component-side claw 19 for the positive-fit partial clutch 16 are firmly connected to the secondary mass 8 of the torsional vibration damper 6. The secondary mass 8 is coupled to the primary mass 7 via a spring 21. The friction partial clutch 10 is arranged in the direction of the motor, i.e., closer to the torque input component 2, and the positive-fit partial clutch is arranged in the direction of the transmission, i.e., closer to the torque output component 3 or the transmission input shaft. The rotary joint is arranged in the axial direction between the positive-fit partial clutch 16 and the friction partial clutch 10.

Figure 2:
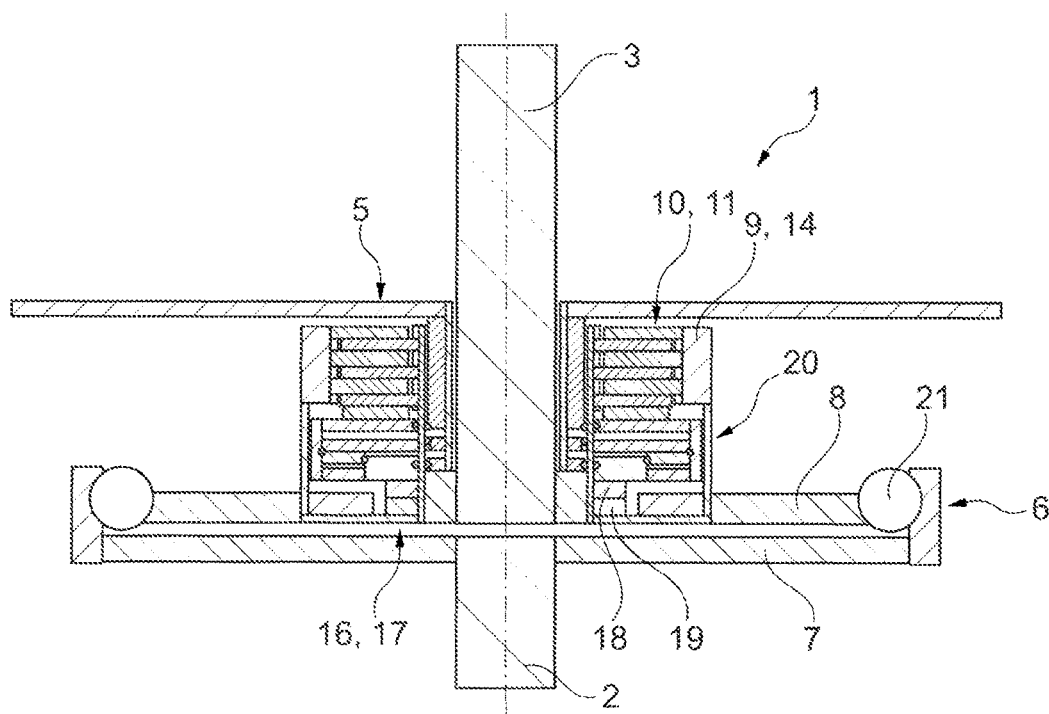
FIG. 2 shows a longitudinal sectional view of the clutch unit in a second exemplary embodiment with the friction partial clutch and the positive-fit partial clutch, which are connected to the secondary mass of the torsional vibration damper, the positive-fit partial clutch being arranged in the direction of the first drive machine.

In the second exemplary embodiment, which is shown in FIG. 2, the outer plate support 14 for the friction partial clutch 10 and the torque input component-side claw 19 for the positive-fit partial clutch 16 are firmly connected to the secondary mass 8 of the torsional vibration damper 6. The friction partial clutch 10 is arranged in the direction of the transmission, thus closer to the torque output component 3, and the positive-fit partial clutch is arranged in the direction of the engine, thus closer to the torque input component 2 or the transmission input shaft. The rotary joint is arranged in the axial direction between the positive-fit partial clutch 16 and the friction partial clutch 10.

Figure 3:
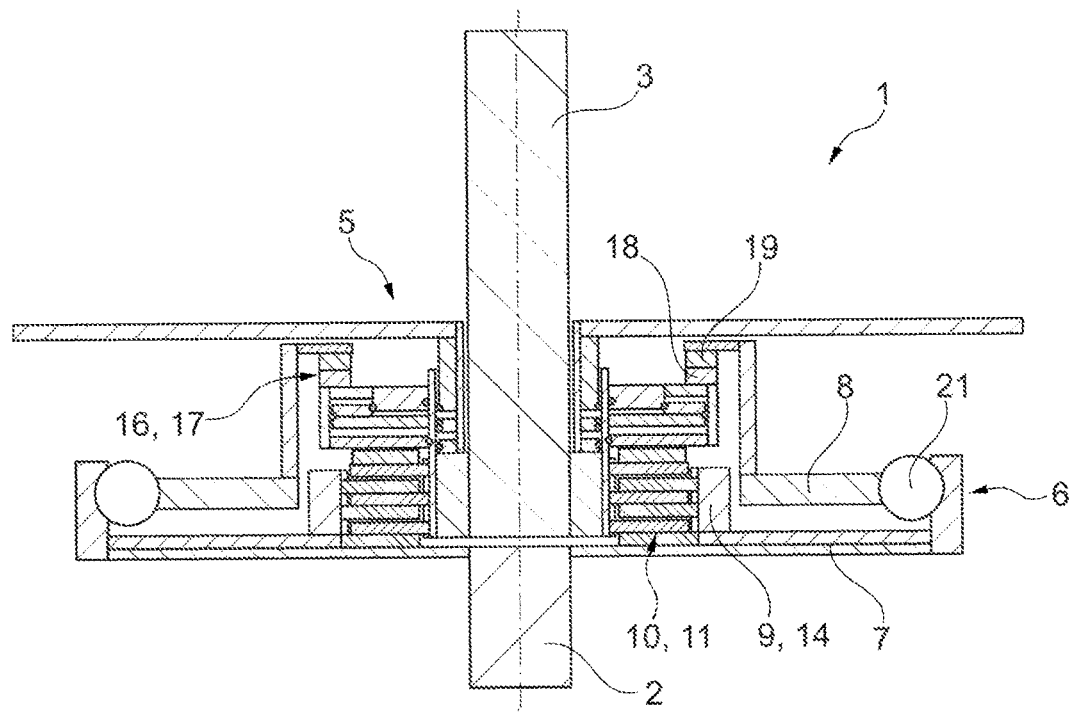
FIG. 3 shows a longitudinal sectional illustration of the clutch unit in a third exemplary embodiment with the friction partial clutch which is connected to a primary mass of the torsional vibration damper and the positive-fit partial clutch which is connected to the secondary mass of the torsional vibration damper, the partial clutches being arranged to be axially nested.

In the third exemplary embodiment, which is shown in FIG. 3, the outer plate support 14 for the friction partial clutch 10 is firmly connected to the primary mass 7 of the torsional vibration damper 6 and the torque input component-side claw 19 for the positive-fit partial clutch 16 is firmly connected to the secondary mass 8 of the torsional vibration damper 6. The friction partial clutch 10 is arranged in the direction of the motor, i.e., closer to the torque input component 2, and the positive-fit partial clutch is arranged in the direction of the transmission, i.e., closer to the torque output component 3 or the transmission input shaft. The partial clutches 10, 16 are arranged nested in the axial direction. The rotary joint is arranged in the axial direction between the positive-fit partial clutch 16 and the friction partial clutch 10.

Figure 4:
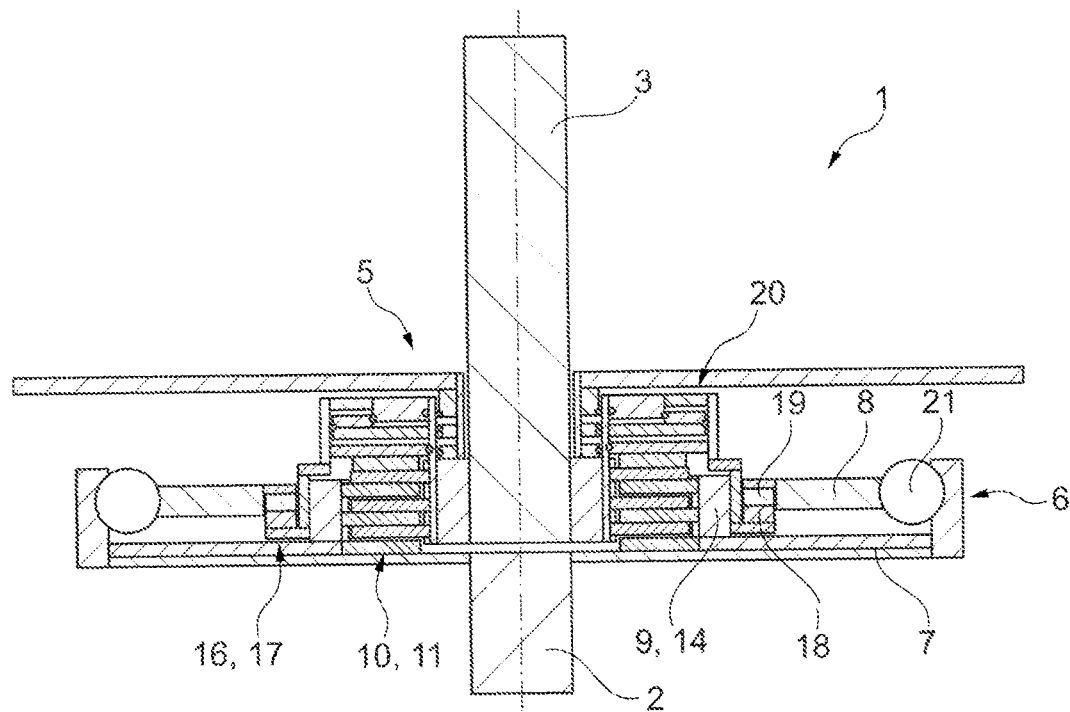
FIG. 4 shows a longitudinal sectional view of the clutch unit in a fourth exemplary embodiment with the friction partial clutch which is connected to the primary mass of the torsional vibration damper and the positive-fit partial clutch which is connected to the secondary mass of the torsional vibration damper, the partial clutches being arranged to be radially nested.

In the fourth exemplary embodiment, which is shown in FIG. 4, the outer plate support 14 for the friction partial clutch 10 is fixedly connected to the primary mass 7 of the torsional vibration damper 6 and the torque input component-side claw 19 for the positive-fit partial clutch 16 is firmly connected to the secondary mass 8 of the torsional vibration damper 6. The partial clutches 10, 16 are arranged in a nested manner in the radial direction, the positive-fit partial clutch 16 being arranged to be radially outside the friction partial clutch 10. The two partial clutches 10, 16 are arranged on the motor side and the rotary joint 20 is arranged on the transmission side.

Figure 5:
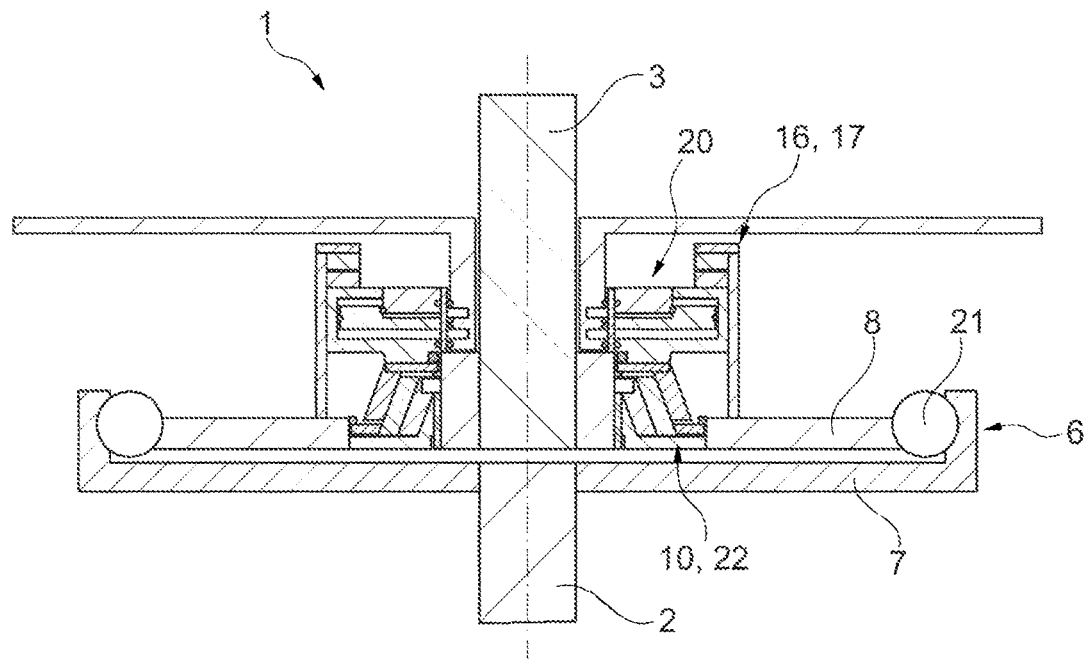
FIG. 5 shows a longitudinal sectional view of the clutch unit in a fifth exemplary embodiment with a cone clutch designed as a friction clutch.

FIG. 5 shows the clutch unit 1 in a fifth exemplary embodiment, which corresponds to the first exemplary embodiment in all features except for the feature that the friction clutch 10 is designed as a cone clutch 22 with conical/tapered friction linings and not as in the first exemplary embodiment as a multi-plate clutch with flat friction linings.

Figure 6:
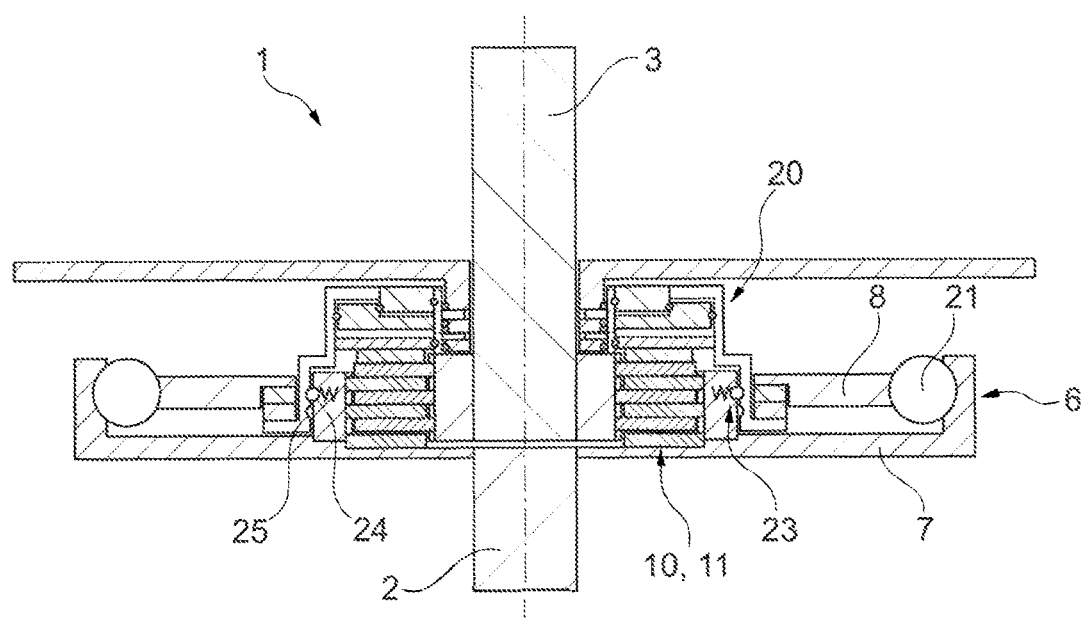
FIG. 6 shows a longitudinal sectional view of the clutch unit in a sixth exemplary embodiment with detents for the positive-fit partial clutch.

FIG. 6 shows the clutch unit 1 in a sixth exemplary embodiment, which corresponds to all features in the fourth exemplary embodiment except for the additional feature that detents 23 are present in the sixth exemplary embodiment. The detents 23 have a spring-loaded ball 24 which engages in corresponding recesses 25 when the dog clutch 17 is in an end position in which the claws 18, 19 are engaged, i.e., the dog clutch 17 is actuated, or in a central position in which the dog clutch 17 and multi-plate clutch 11 are open.

LIST OF REFERENCE NUMBERS

1 Clutch unit
2 Torque input component
3 Torque output component
4 Friction element
5 Clutch/Separating clutch
6 Torsional vibration damper
7 Primary mass
8 Secondary mass
9 Plate support
10 Friction partial clutch
11 Multi-plate clutch
12 Inner plate support
13 Inner plate
14 Outer plate support
15 Outer plate support
16 Positive-fit partial clutch
17 Dog clutch
18 Claw
19 Claw
20 Rotary joint
21 Spring
22 Cone clutch
23 Detent
24 Ball
25 Recess

The invention claimed is:
1. A clutch unit for a powertrain of a motor vehicle, comprising: a torque input component acting as a drive element, a torque output component acting as an output element configured to be selectively connected for transmitting torque to the torque input component so as to transmit a torque via a clutch configured to be shifted using a friction element, and with a torsional vibration damper with two masses which are damped relative to each other to reduce rotational irregularities, which is arranged between the torque input component and the torque output component, wherein at least one of the two masses of the torsional vibration damper are simultaneously designed as a support for the friction element, wherein the clutch has first and second partial clutches configured to selectively connect the torque input component and the torque output component so as to transmit the torque, wherein a rotary joint is provided that abuts the first partial clutch at one end and the second partial clutch at another, axially opposite end, wherein the rotary joint is configured to actuate the first and second partial clutches.

2. The clutch unit according to claim 1, wherein at least one mass carrying the friction element is designed as a plate support.

3. The clutch unit according to claim 1, wherein the clutch and the torsional vibration damper are arranged to be radially nested.

4. The clutch unit according to claim 1, wherein the torsional vibration damper is arranged in a radial direction outside the clutch.

5. The clutch unit according to claim 1, wherein one of the first or second partial clutches is designed as a positive-fit clutch and the other of the first or second partial clutches is designed as a friction clutch.

6. The clutch unit according to claim 5, wherein an operating direction of the one partial clutch is opposite to an operating direction of the other partial clutch.

7. The clutch unit according to claim 5, wherein the torsional vibration damper is arranged such that it is decoupled from the powertrain when the positive-fit partial clutch is not actuated.

8. A hybrid module comprising a first drive machine, an output shaft of which can be connected to an output shaft of a second drive machine or a transmission input shaft via the clutch unit according to claim 1.

* * * * *